(12) United States Patent
Dotan et al.

(10) Patent No.: US 7,251,561 B2
(45) Date of Patent: *Jul. 31, 2007

(54) SELECTIVE DOWNLOAD OF CORRIDOR MAP DATA

(75) Inventors: Emanuel Dotan, Kfar Vradim (IL); Michael Menachem Kupferman, Zichron Ya'akov (IL); Tal Elad, Holon (IL)

(73) Assignee: Telmap Ltd., Herzlia (IL)

( * ) Notice: Subject to any disclaimer, the term of this patent is extended or adjusted under 35 U.S.C. 154(b) by 485 days.

This patent is subject to a terminal disclaimer.

(21) Appl. No.: 10/900,707

(22) Filed: Jul. 28, 2004

(65) Prior Publication Data

US 2006/0025923 A1   Feb. 2, 2006

(51) Int. Cl.
  *G01C 21/00* (2006.01)
(52) U.S. Cl. ................................ 701/207; 701/202
(58) Field of Classification Search ............... 701/25, 701/26, 35, 200, 201, 202, 207, 208, 211, 701/212; 340/990, 995.14
See application file for complete search history.

(56) References Cited

U.S. PATENT DOCUMENTS

| | | | |
|---|---|---|---|
| 4,571,684 A | 2/1986 | Takanabe et al. | |
| 5,689,717 A | 11/1997 | Pritt | |
| 5,724,072 A | 3/1998 | Freeman et al. | |
| 5,988,853 A | 11/1999 | Kim et al. | |
| 6,038,559 A | 3/2000 | Ashby et al. | |
| 6,107,944 A | 8/2000 | Behr et al. | |
| 6,188,955 B1 | 2/2001 | Robinson et al. | |
| 6,233,518 B1 | 5/2001 | Lee | |
| 6,236,357 B1 | 5/2001 | Corwith | |
| 6,278,939 B1 | 8/2001 | Robare et al. | |
| 6,282,489 B1 | 8/2001 | Bellesfield et al. | |
| 6,314,369 B1 | 11/2001 | Ito et al. | |

(Continued)

FOREIGN PATENT DOCUMENTS

DE    196 51 146    6/1998

(Continued)

OTHER PUBLICATIONS

"Platform Abstraction of Input Method Using Proxy Server", IBM Technical Disclosure Bulletin, IBM Corp. New York, U.S. vol. 40, No. 4, Apr. 1, 1997.

(Continued)

*Primary Examiner*—Gertrude A. Jeanglaude
(74) *Attorney, Agent, or Firm*—Ladas and Parry LLP

(57) ABSTRACT

A method for displaying a map on a mobile client device. The method includes storing map data on a server, the map data including road data with respect to roads of multiple different road types. The server determines a route from a starting point to a destination within an area covered by the map data, the route including one or more route segments. The server defines a corridor map including the route segments and the roads of the different road types that are within different, respective distances, determined by the road types, of the route segments. The server downloads the road data with respect to the route segments and the roads of the different road types included in the corridor map to the client device. The client device, using the downloaded road data, renders one or more images, each image comprising at least a respective portion of the corridor map.

94 Claims, 8 Drawing Sheets

U.S. PATENT DOCUMENTS

| | | |
|---|---|---|
| 6,320,518 B2 | 11/2001 | Saeki et al. |
| 6,347,278 B2 | 2/2002 | Ito |
| 6,381,535 B1 | 4/2002 | Durocher et al. |
| 6,462,676 B1 | 10/2002 | Koizumi |
| 6,493,630 B2 | 12/2002 | Ruiz et al. |
| 6,526,284 B1 | 2/2003 | Sharp et al. |
| 6,565,610 B1 | 5/2003 | Wang et al. |
| 6,643,650 B1 | 11/2003 | Slaughter et al. |
| 6,678,535 B1 | 1/2004 | Narayanaswami |
| 6,747,649 B1 | 6/2004 | Sanz-Pastor et al. |
| 6,826,385 B2 | 11/2004 | Kujala |
| 6,834,195 B2 | 12/2004 | Brandenberg et al. |
| 6,854,115 B1 | 2/2005 | Traversat et al. |
| 6,898,516 B2 * | 5/2005 | Pechatnikov et al. ....... 701/202 |
| 6,931,429 B2 | 8/2005 | Gouge et al. |
| 6,934,755 B1 | 8/2005 | Saulpaugh et al. |
| 6,970,869 B1 | 11/2005 | Slaughter et al. |
| 7,117,266 B2 | 10/2006 | Fishman et al. |
| 2001/0001847 A1 | 5/2001 | Hessing |
| 2001/0045949 A1 | 11/2001 | Chithambaram et al. |
| 2002/0111146 A1 | 8/2002 | Fridman et al. |
| 2003/0117297 A1 | 6/2003 | Obradovich et al. |
| 2003/0229441 A1 | 12/2003 | Pechatnikov et al. |
| 2004/0030493 A1 | 2/2004 | Pechatnikov et al. |
| 2004/0058652 A1 | 3/2004 | McGregor et al. |
| 2005/0021876 A1 | 1/2005 | Asai et al. |

FOREIGN PATENT DOCUMENTS

| | | |
|---|---|---|
| DE | 100 29 198 | 12/2001 |
| EP | 0 875 878 | 11/1998 |
| EP | 1 118 837 | 7/2001 |
| EP | 1 186 863 | 3/2002 |
| WO | WO 01/01370 | 1/2001 |
| WO | WO 01/27812 | 4/2001 |

OTHER PUBLICATIONS

Beckmann, et al, "The R*-Tree: An Efficient and Robust Access Method for Points and Rectangles", Proceedings of ACM SIGMOD International Conference on Management of Data (1990), pp. 322-331.

Cherkassky et al, "Shortest Path Algorithms: Theory and Experimental Evaluation", Technical Report 93-1480, Department of Computer Science, Stanford University, (Stanford, California, 1993).

Ken-ichi Saito, et al, Vector Map Delivery System for Mobile Terminals, Nov. 2001.

http://www.intergraph.com, 2002.

http://www.intelliwhere.com, 2002.

http://www.microsoft.com/mappoint/net, 2003.

Nigel Conolly, "Software for Mobile Mapping", Feature Article-issue 47, 2003.

http://www.map24.com, 2002.

Introduction—SVG 1.0—Sep. 2001.

Automation of Map Generalization, ESRI White Paper Series, May 1996.

* cited by examiner

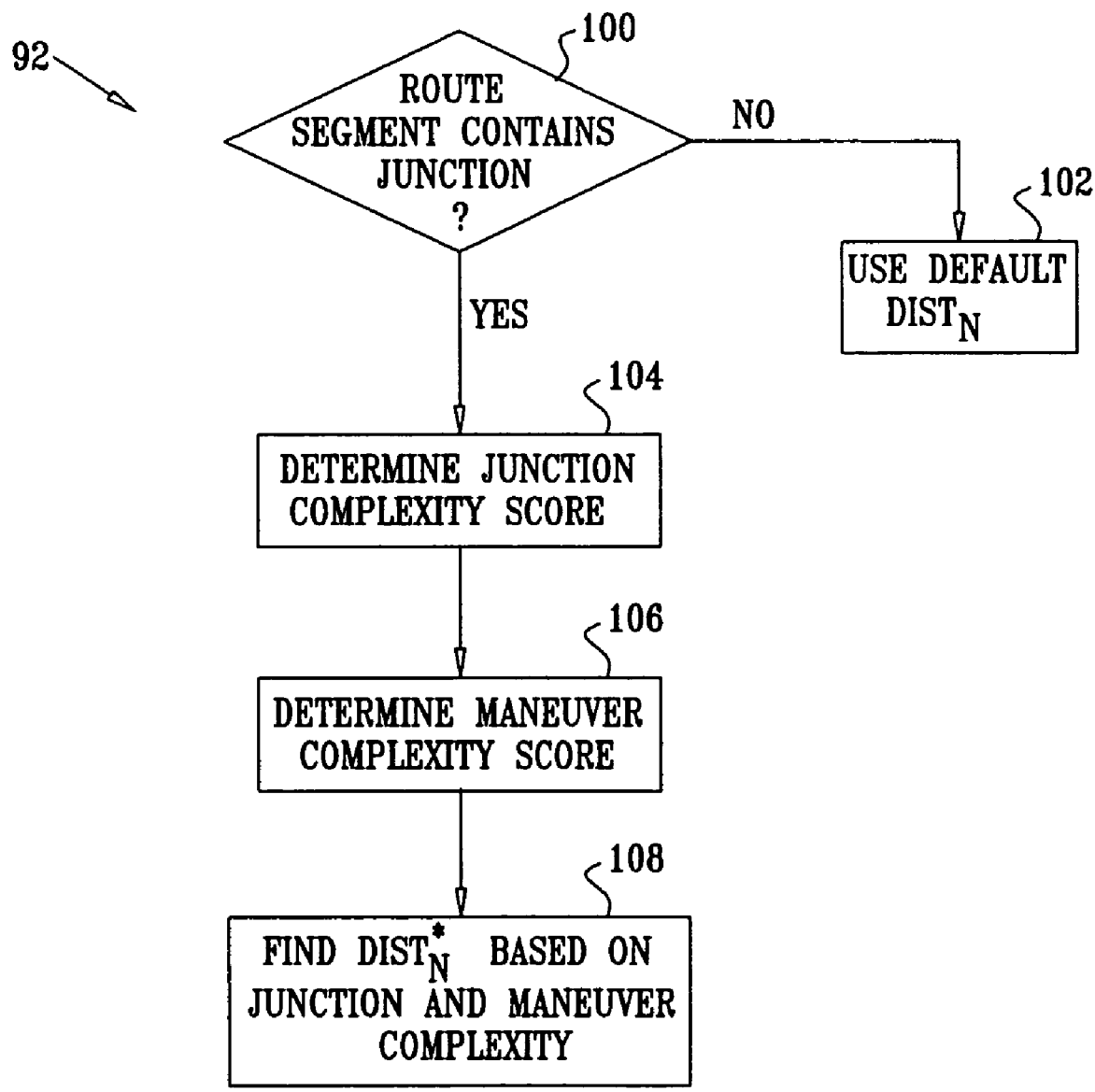

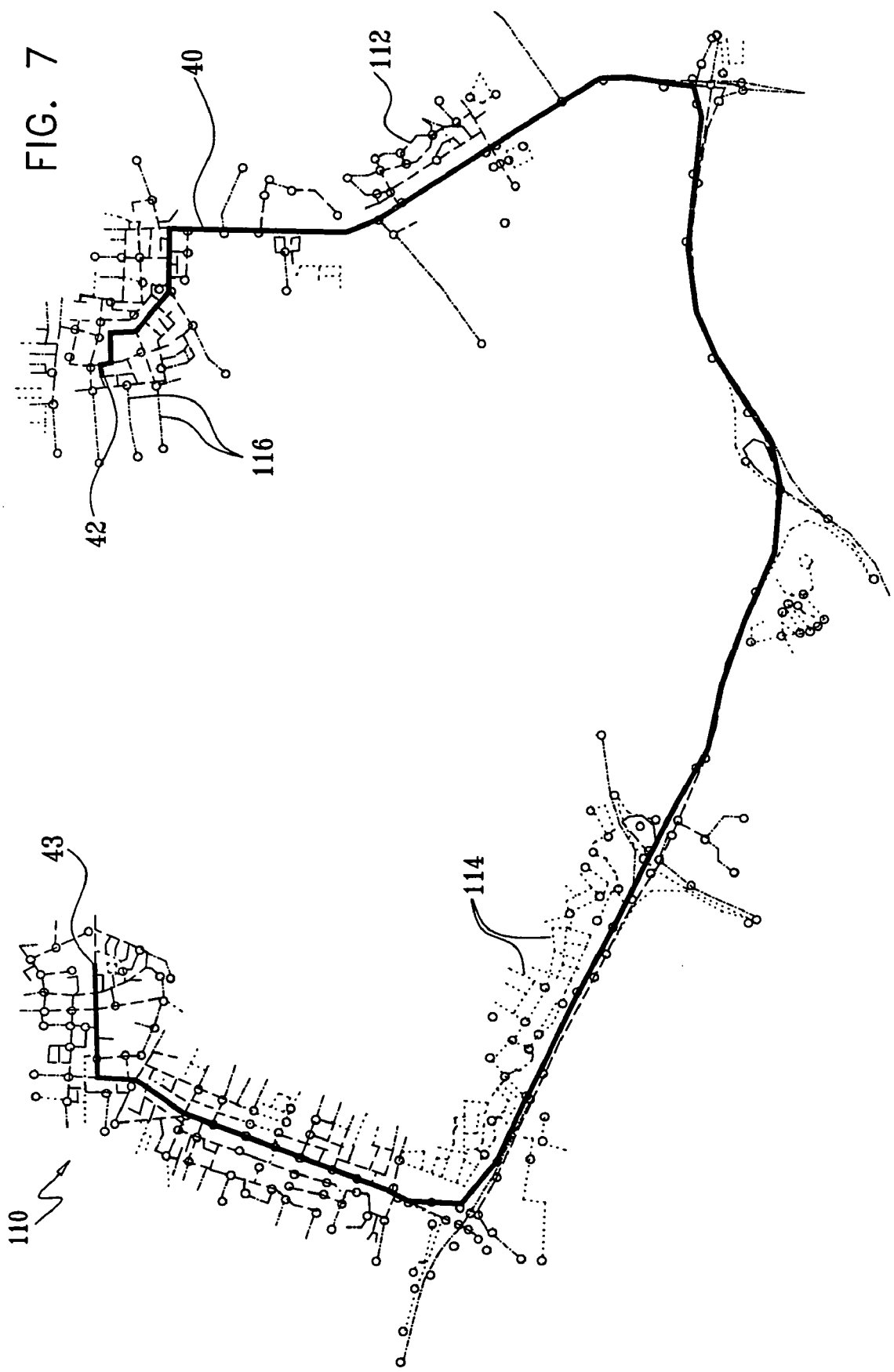

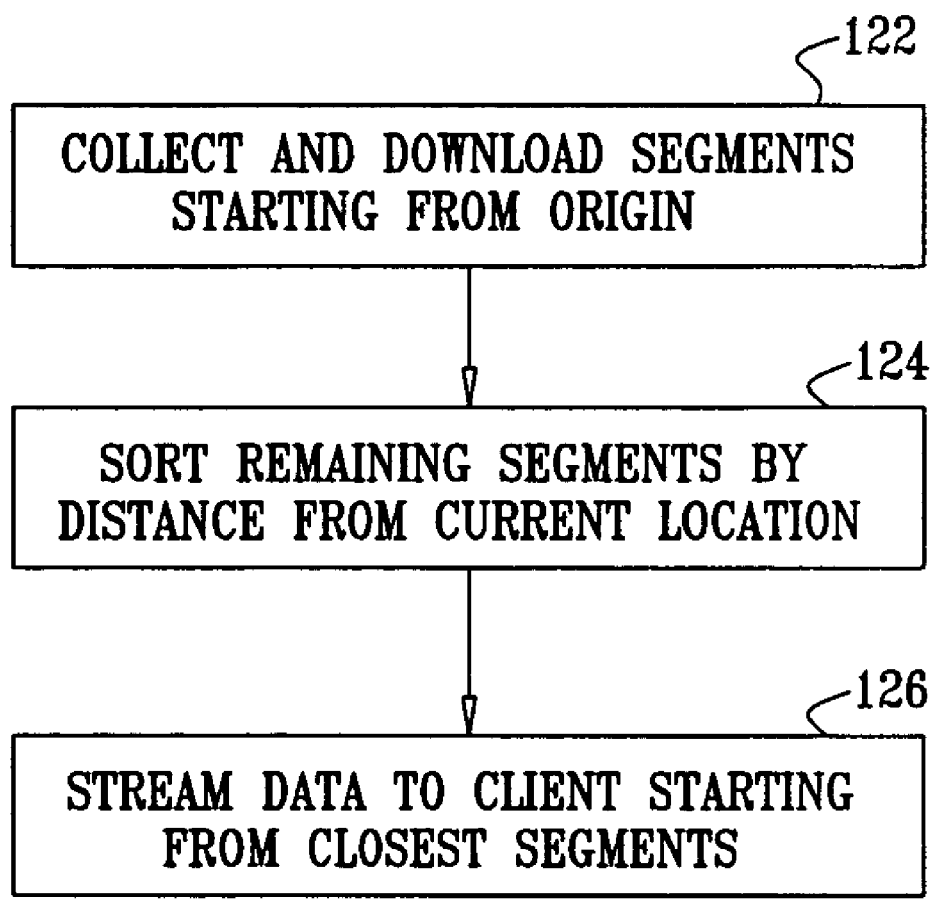

SELECTIVE DOWNLOAD OF CORRIDOR MAP DATA

CROSS-REFERENCE TO RELATED APPLICATION

This application is related to U.S. patent application Ser. No. 10/426,946, filed Apr. 30, 2003, published as US 2004/0030493 A1, which is assigned to the assignee of the present patent application and whose disclosure is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to methods and systems for electronic download and display of maps, and specifically to route corridor maps.

BACKGROUND OF THE INVENTION

A variety of systems are known in the art for providing drivers with in-vehicle electronic routing maps and navigation aids. These systems are commonly coupled to a location-finding device in the vehicle, such as a Global Positioning System (GPS) receiver. The GPS receiver automatically determines the current location of the vehicle, to be displayed on the map and used in determining routing instructions.

In-vehicle navigation systems fall into two general categories: "on-board" systems, in which the map data are stored electronically in the vehicle (typically on optical or magnetic media); and "off-board" systems, in which the map data are furnished by a remote map server. Off-board systems typically use a client program running on a smart cellular telephone or personal digital assistant (PDA) in the vehicle to retrieve information from the server over a wireless link, and to display maps and provide navigation instructions to the driver.

Various off-board navigation systems are described in the patent literature. For example, the above-mentioned Patent Application Publication US 2004/0030493 A1 describes a method for displaying a map on a mobile client device. Map data, including vector information delineating features in the map, are stored on a server. The server determines a route from a starting point to a destination within an area of the map. The route includes a sequence of route segments, each having a respective length and heading angle. The server then defines a corridor map comprising a sequence of map segments, each of which contains a respective route segment and has a respective zoom level and orientation determined by the length and heading angle of the route segment. The server downloads the vector information in the map segments to the client device, which renders a succession of images of the map segments as the user travels along the route. Typically, each map segment includes crossroads that intersect the route. If the user deviates from the route, the client device displays a return path to the route on one of the crossroads.

As another example, U.S. Pat. No. 6,381,535, whose disclosure is incorporated herein by reference, describes improvements required to convert a portable radiotelephone into a mobile terminal capable of functioning as a navigational aid system. Itinerary requests of the mobile terminal are transmitted to a centralized server by a radio relay link. The server calculates the itinerary requested, and transmits the itinerary to the mobile terminal in the form of data concerning straight lines and arc segments constituting the itinerary. The server also evaluates the possibility of the vehicle deviating from its course and transmits data concerning segments of possible deviation itineraries in an area of proximity to the main itinerary.

Other off-board navigation systems are described in PCT Publications WO 01/01370 and WO 01/27812; in U.S. Pat. Nos. 6,038,559, 6,107,944, 6,233,518, 6,282,489, 6,320,518, 6,347,278, 6,381,535, 6,462,676, 6,43,630 and 6,526,284; and in U.S. Patent Application Publication 2001/0045949. The disclosures of all these patents and publications are incorporated herein by reference.

SUMMARY OF THE INVENTION

In order to assist the user of a navigation system in recovering from a deviation from the original, planned route, it is desirable to present the user with a complete, accurate picture of all the roads in the vicinity of the route. Off-board navigation systems, however, are subject to bandwidth constraints, which limit the amount of map data that can be transmitted over the air from the server to the user's client device. Therefore, the amount of ancillary road data that can be downloaded along with the actual route is severely limited.

When a user who is driving along a given route deviates onto a high-speed road, such as a freeway, he or she may have to drive a long distance before being able to return to the desired route. On the other hand, slower roads tend to have more intersections and more opportunities for maneuvering, so that a deviation onto a slower road is less likely to take the driver far away from the original route. In either case (although particularly when the driver deviates onto a high-speed road), the optimal route for the driver to take after the deviation may not be simply to return to the original route, but rather to continue traveling on a new route. Narrow corridor maps, however, are generally not capable of supporting this sort of rerouting.

In response to these shortcomings of the prior art, some embodiments of the present invention provide corridors maps having variable effective widths. In these embodiments, a server determines a route from a starting point to a destination, and downloads a corridor map of the route to a client device. In addition to the segments of the route itself, the server includes in the corridor map other roads in the vicinity of the route segments. These other roads are typically of different types, from high-speed, limited-access roads, to small, local streets. The server decides which roads to include in the map depending on the distances of the roads from the route. The map includes the roads of each type that are within a respective maximum distance from the route that is determined for that particular type of road. Typically, the maximum distance for high-speed roads is much greater than that for low-speed, smaller roads, so that the map includes high-speed roads that may be relatively far from the route, but includes low-speed roads only within a narrow range of the route.

Corridor maps that are generated in this manner can make the most of the limited available server/client bandwidth, so as to present the user with the road detail that is likely to be most useful in the event of a deviation from the original route. Furthermore, in some embodiments, the server computes optimal routes to the destination from the roads in the corridor map onto which the user may deviate from the original route. Inclusion in the corridor map of high-speed roads that are relatively far from the original route makes it possible to find and display on the client device efficient alternate routes that do not require the user simply to return to the original route.

In some embodiments of the present invention, the maximum distances for inclusion of the various road types in the corridor map have different values along different parts of the route. For example, in the vicinity of junctions along the route at which the user is likely to make a wrong turn, the maximum distances may be increased. Typically, for this purpose, the server calculates a score based on the complexity of the junction and/or the complexity of the maneuver that the user must perform at the junction. The score is used, in turn, to determine the maximum distances for inclusion of other roads in the vicinity of the junction. Additionally or alternatively, the distances may be adjusted based on the available bandwidth, whereby roads are added to the corridor map at increasingly greater distances from the route until the data volume of the map reaches a predetermined limit.

There is therefore provided, in accordance with an embodiment of the present invention, a method for displaying a map on a mobile client device, the method including:

storing map data on a server, the map data including road data with respect to roads of multiple different road types;

determining a route from a starting point to a destination within an area covered by the map data, the route including one or more route segments;

defining a corridor map on the server, the corridor map including the route segments and the roads of the different road types that are within different, respective distances, determined by the road types, of the route segments;

downloading the road data with respect to the route segments and the roads of the different road types included in the corridor map from the server to the client device; and rendering on the client device, using the downloaded road data, one or more images, each image including at least a respective portion of the corridor map.

Typically, determining the route includes determining the route along which a user of the client device is to travel, and rendering the images includes rendering the images in a succession as the user travels along the route. In some embodiments, rendering the images includes finding position coordinates of the user using a location providing device associated with the client device, and displaying the images together with a navigation aid based on the position coordinates. In an aspect of the invention, finding the position coordinates includes receiving an initial location reading from the location providing device, and matching the initial location reading to the downloaded road data in order to find the position coordinates with respect to the corridor map. Additionally or alternatively, downloading the road data includes streaming the road data to the client device as the user travels along the route.

In disclosed embodiments, downloading the portion of the map data includes downloading the map data over a wireless link. Typically, the client device includes at least one of a cellular telephone and a personal digital assistant (PDA), which communicates with the server over a cellular telephone network that includes the wireless link. In one embodiment, downloading the road data includes downloading, together with the road data, a prompt associated with at least one of the route segments, so as to cause the client device to request updated information from the server as a user of the client device travels over the route in a vicinity of the at least one of the route segments.

In one embodiment, a classification of the roads into the different road types corresponds to expected speeds of travel on the roads. Typically, the road types include at least first and second road types, the first road type having a higher expected speed of travel than the second road type, and defining the corridor map includes incorporating in the map segments the roads of the first and second road types that are within respective first and second distances of the route segments, such that the first distance is greater than the second distance.

Typically, the road types include highways and local streets, and defining the corridor map includes incorporating in the map segments the highways that are within a first distance of the route segments and the local streets that are within a second distance of the route, such that the first distance is greater than the second distance.

In some embodiments, determining the route includes identifying junctions along the route, and associating respective measures of complexity with the junctions, and defining the corridor map includes modifying the respective distances responsively to the measures of complexity. Typically, modifying the respective distances includes increasing the respective distances in a vicinity of the junctions that are characterized as complex junctions. In one aspect of the invention, associating the respective measures of complexity includes determining a junction complexity score for each junction responsively to a topology of the junction. In another aspect of the invention, determining the route includes defining maneuvers to be performed at the junctions along the route, and associating the respective measures of complexity includes determining a maneuver complexity score for each maneuver.

In a further embodiment, defining the corridor map includes identifying junctions at which the roads included in the one or more map segments intersect with further roads of the different road types that are not within the respective distances, and adding one or more of the further roads to the one or more map segments.

In an aspect of the invention, determining the route includes determining the route along which a user of the client device is to travel, and defining the corridor map includes determining a respective path to the destination from each of at least some of the roads included in each of the map segments, and the method includes downloading the respective path to the client device in order to guide the user to the destination in the event of a deviation from the route onto one of the at least some of the roads. Typically, downloading the respective path includes associating with each of the roads in the corridor map a pointer to a subsequent road along the respective path, and downloading the pointer to the client device.

In a disclosed embodiment, the corridor map has a width that is defined at each point along the route by an extent of the roads of the different road types that are included in the corridor map in a vicinity of the point, and the width of the corridor map varies along the route responsively to the extent of the roads.

In an aspect of the invention, downloading the road data includes sorting the roads according to a respective distance of each of the roads from a location of the client device, and downloading the road data with respect to the roads in an order responsive to the distance. In one embodiment, downloading the road data includes streaming the road data to the client device in the order responsive to the distance as a user of the client device travels along the route.

In another aspect of the invention, downloading the road data includes downloading data structures that represent the roads, each data structure indicating a directional link. Each data structure may include one or more data fields indicating characteristics of the directional link selected from a group of characteristics consisting of a next link along an optimal route to the destination, a distance to the destination, and a time required to travel to the destination.

There is also provided, in accordance with an embodiment of the present invention, a method for displaying a map on a mobile client device, the method including:

storing map data on a server;

determining a route at the server from a starting point to a destination within an area covered by the map data, the route including a sequence of the directional links, in which each directional link is represented by a data structure containing a pointer to a succeeding directional link along the route;

downloading the route from the server to the client device; and rendering on the client device, using the downloaded route, a map indicative of the route.

Typically, the method includes generating navigation instructions for a user of the client device based on the pointer in one or more of the data structures. In a disclosed embodiment, rendering the map includes rendering a maneuver map responsively to the navigation instructions. Additionally or alternatively, the method includes defining a corridor map on the server, the corridor map including the route and further directional links corresponding to other roads included in the map data in a vicinity of the route, and generating the navigation instructions includes guiding the user to the destination, responsively to the pointer in one or more of the data structures corresponding to the other roads, in the event of a deviation from the route onto one of the other roads.

In a disclosed embodiment, rendering the map includes rendering a single road segment to represent two of the directional links corresponding to opposing directions of travel on the single road segment.

In some embodiments, the method includes defining a corridor map on the server, the corridor map including the route and other roads included in the map data in a vicinity of the route, wherein downloading the route includes sorting the other roads in the corridor map according to a respective distance of each of the roads from a location of the client device, and downloading the map data with respect to the other roads in an order responsive to the distance. In an aspect of the invention, downloading the map data includes streaming the map data to the client device in the order responsive to the distance as a user of the client device travels along the route. In a disclosed embodiment, downloading the map data includes performing a breadth-first search of the other roads connecting to the starting point of the route, and downloading the map data with respect to the roads found by the breadth-first search immediately after downloading the route.

There is additionally provided, in accordance with an embodiment of the present invention, a method for displaying a map on a mobile client device, the method including:

storing map data on a server;

determining a route at the server from a starting point to a destination within an area covered by the map data, the route including a sequence of route segments;

associating a prompt with at least one of the route segments, so as to cause a client device to request updated information with respect to the route as a user of the client device travels over the route at a location associated with the at least one of the route segments;

downloading the route segments from the server to the client device;

rendering on the client device, using the downloaded route segments, a map indicative of the route; and responsively to the prompt, receiving a request from the client device for the updated information, and providing the updated information with respect to the route.

Typically, downloading the route segments includes downloading data to the client device over a wireless link, and receiving the request includes receiving a communication initiated by the client device over the wireless link. In a disclosed embodiment, receiving the communication includes receiving a Hypertext Transfer Protocol (HTTP) request, and providing the updated information includes sending a HTTP response.

Providing the updated information may include informing the client device of a change in the route.

There is further provided, in accordance with an embodiment of the present invention, apparatus for displaying a map on a mobile client device, the apparatus including:

a memory, which is arranged to store map data, including road data with respect to roads of multiple different road types; and a server, which is adapted to determine a route from a starting point to a destination within an area covered by the map data, the route including one or more route segments, and which is adapted to define a corridor map including the route segments and the roads of the different road types that are within different, respective distances, determined by the road types, of the route segments, and to download the road data with respect to the route segments and the roads of the different road types included in the corridor map to the client device so as to enable the client device, using the downloaded road data, to render one or more images, each image including at least a respective portion of the corridor map.

There is moreover provided, in accordance with an embodiment of the present invention, apparatus for displaying a map on a mobile client device, the apparatus including:

a memory, which is arranged to store map data;

a server, which is adapted to determine a route from a starting point to a destination within an area covered by the map data, the route including a sequence of the directional links, in which each directional link is represented by a data structure containing a pointer to a succeeding directional link along the route, and to download the route to the client device, so as to enable the client device, using the downloaded route, to render a map indicative of the route.

There is furthermore provided, in accordance with an embodiment of the present invention, apparatus for displaying a map on a mobile client device, the apparatus including:

a memory, which is arranged to store map data;

a client device; and a server, which is adapted to determine a route from a starting point to a destination within an area covered by the map data, the route including a sequence of route segments, and to associate a prompt with at least one of the route segments, so as to cause the client device to request updated information with respect to the route as a user of the client device travels over the route at a location associated with the at least one of the route segments, and which is coupled to download the route segments to the client device, wherein the client device is adapted to render an image of a map indicative of the route, using the downloaded route segments, and is further adapted, responsively to the prompt, to submit a request to the server for the updated information, and wherein the server is adapted to provide the updated information with respect to the route in response to the request.

There is also provided, in accordance with an embodiment of the present invention, a computer software product for displaying a map on a mobile client device, the product including a computer-readable medium in which program instructions are stored, which instructions, when read by a computer, cause the computer to read map data, including road data with respect to roads of multiple different road types, and to determine a route from a starting point to a destination within an area covered by the map data, the route including one or more route segments, the instructions further causing the computer to define a corridor map including the route segments and the roads of the different road types that are within different, respective distances, determined by the road types, of the route segments, and to download the road data with respect to the route segments and the roads of the different road types included in the corridor map to the client device so as to enable the client device, using the downloaded road data, to render one or more images, each image including at least a respective portion of the corridor map.

There is additionally provided, in accordance with an embodiment of the present invention, a computer software product for displaying a map on a mobile client device, the product including a computer-readable medium in which program instructions are stored, which instructions, when read by a computer, cause the computer to read map data, and to determine a route from a starting point to a destination within an area covered by the map data, the route including a sequence of the directional links, in which each directional link is represented by a data structure containing a pointer to a succeeding directional link along the route, and to download the route to the client device, so as to enable the client device, using the downloaded route, to render a map indicative of the route.

There is further provided, in accordance with an embodiment of the present invention, a computer software product for displaying a map on a mobile client device, the product including a computer-readable medium in which program instructions are stored, which instructions, when read by a computer, cause the computer to read map data and to determine a route from a starting point to a destination within an area covered by the map data, the route including a sequence of route segments, and to associate a prompt with at least one of the route segments, so as to cause the client device to request updated information with respect to the route as a user of the client device travels over the route at a location associated with the at least one of the route segments, and to download the route segments to the client device so as to enable the client device to render an image of a map indicative of the route, using the downloaded route segments, the instructions further causing the computer to receive, responsively to the prompt, a request from the client device for the updated information, and to provide the updated information with respect to the route in response to the request.

The present invention will be more fully understood from the following detailed description of the embodiments thereof, taken together with the drawings in which:

BRIEF DESCRIPTION OF THE DRAWINGS

FIG. 6 is a flow chart that schematically illustrates a method for determining a distance within which roads are to be included in a route corridor map, in accordance with an embodiment of the present invention;

FIG. 7 is a schematic representation of a route corridor map, generated in accordance with an embodiment of the present invention; and FIG. 8 is a flow chart that schematically illustrates a method for downloading map data to a client, in accordance with an embodiment of the present invention.

DETAILED DESCRIPTION OF EMBODIMENTS

Figure 1:
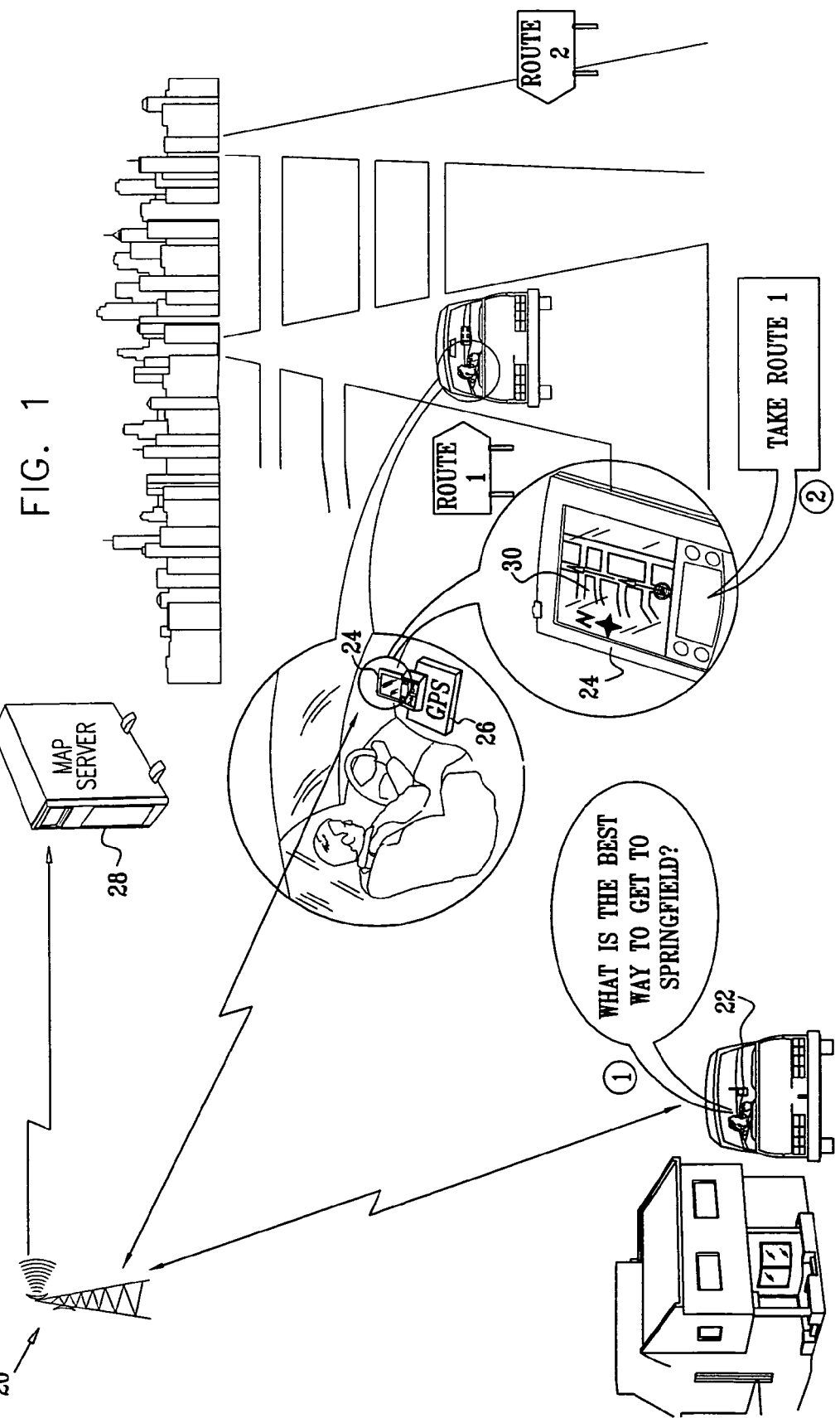
FIG. 1 is a simplified pictorial illustration of a real-time map distribution and display system constructed and operative in accordance with an embodiment of the present invention.

FIG. 1 is a simplified pictorial illustration of a real-time map distribution and display system 20, constructed and operative in accordance with an embodiment of the present invention. As seen in FIG. 1, a driver of a vehicle 22 communicates with a map server 28 via a client device 24, typically a wireless communicator, such as a personal digital assistant (PDA) 24 having cellular telephone functionality or a smart cellular telephone. Optionally, PDA 24 communicates with server 28 via an interactive voice response (IVR) processor and/or via the Internet. Server 28 typically comprises a general-purpose computer, comprising a memory in which map data are stored and processor, which carries out the methods described herein under the control of software. The software may be downloaded to the processor in electronic form, over a network, for example, or it may alternatively be provided on tangible media, such as CD-ROM, DVD, magnetic media or non-volatile memory.

A location data output is provided by a GPS receiver 26 or other locating device in the vehicle, and the location is transmitted automatically by client device 24 to server 28. Alternatively, a cellular network with which client device 24 communicates may provide the location data output to server 28, or the user may supply location data via the client device.

In the illustrated embodiment, the driver of vehicle 22 asks for current directions and a map showing a route from his current location to a given destination. Map server 28 computes the preferred route to the destination, and then generates a corridor map showing the route. The corridor map comprises map data, typically in the form of vector data, which delineates the route, along with other roads in the vicinity of the route. Based on the map data, a client program running on client device 24 renders a map showing the preferred route on a display 30. Methods for generating a corridor map using vector data, and for rendering the map on a client device, are described further in the above-mentioned U.S. patent application Ser. No. 10/426,946. In system 20, the roads to be included in the map data are chosen based on the road types and the distances of the roads from the route, wherein different maximum distances for road inclusion are applied to different road types. This aspect of the present invention is described further hereinbelow.

Typically, client device 24 outputs navigation instructions to the driver, based on the route calculated by server 28. The navigation instructions are generally shown on display 30 along with the map, and they may also be enunciated by the client device using text-to-speech functionality. In addition, server 28 may calculate alternate routes to the destination, to be followed in case vehicle 22 deviates from the original route, and may download these alternate routes to client device 24 along with the map data. For example, assuming the original route to the destination to be Route 1, as shown in the figure, the user may mistakenly turn right off the route. In this case, based on the alternate route downloaded from server 28, client device 24 may instruct the user to turn left onto Route 2, and to continue in this manner to the destination rather than attempting to return to Route 1. This alternate routing is made possible by the selective inclusion in the map data of the additional roads that are in the vicinity of the original route. Additionally or alternatively, client device 24 may use the map data in computing alternate routes in the event of a wrong turn.

Figure 2:
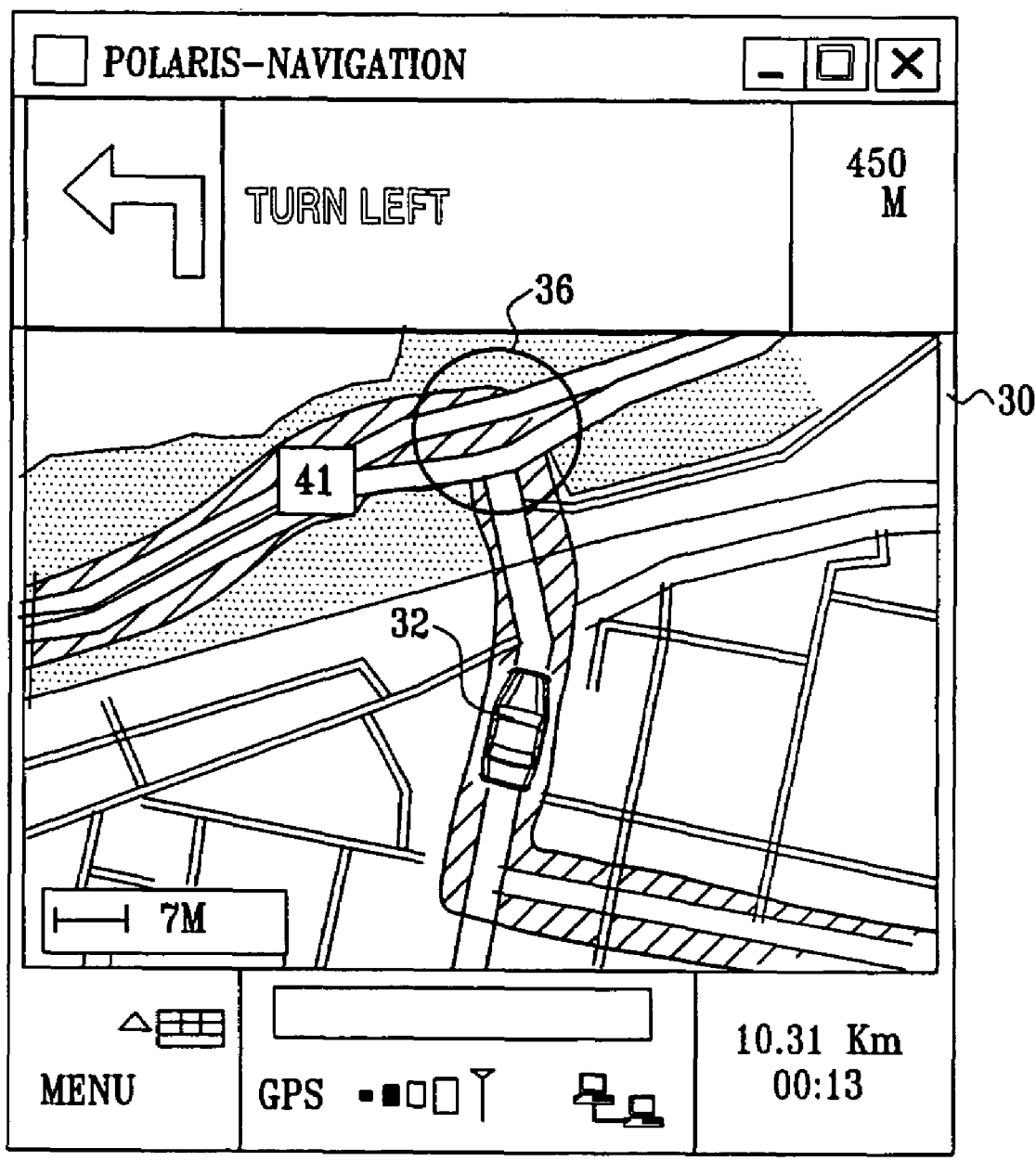
FIG. 2 is a schematic representation of a screen displayed on a client device in a vehicle, showing a map and directions generated by the system of FIG. 1, in accordance with an embodiment of the present invention.

FIG. 2 is a schematic representation of display 30, showing a map displayed by the client program running on client device 24 in the course of a trip in vehicle 22, in accordance with an embodiment of the present invention. This map is one of a sequence of maps displayed in succession in the course of the trip, each showing a successive part of the route corridor depending on the current location of the vehicle. An icon 32 shows the current position of vehicle 22 on a road 34 that is part of the route. Because of limitations in the accuracy of GPS receiver 26, client device 24 may correct the position coordinates provided by the receiver to show the true location of vehicle 22 relative to the map shown on display 30. The route provided by map server 28 is marked by highlighting. The display provides driving directions ("turn left") with respect to a junction 36 that the vehicle is approaching, as well as other textual information. These display features are further described in the above-mentioned U.S. patent application Ser. No. 10/426,946.

Figure 3:
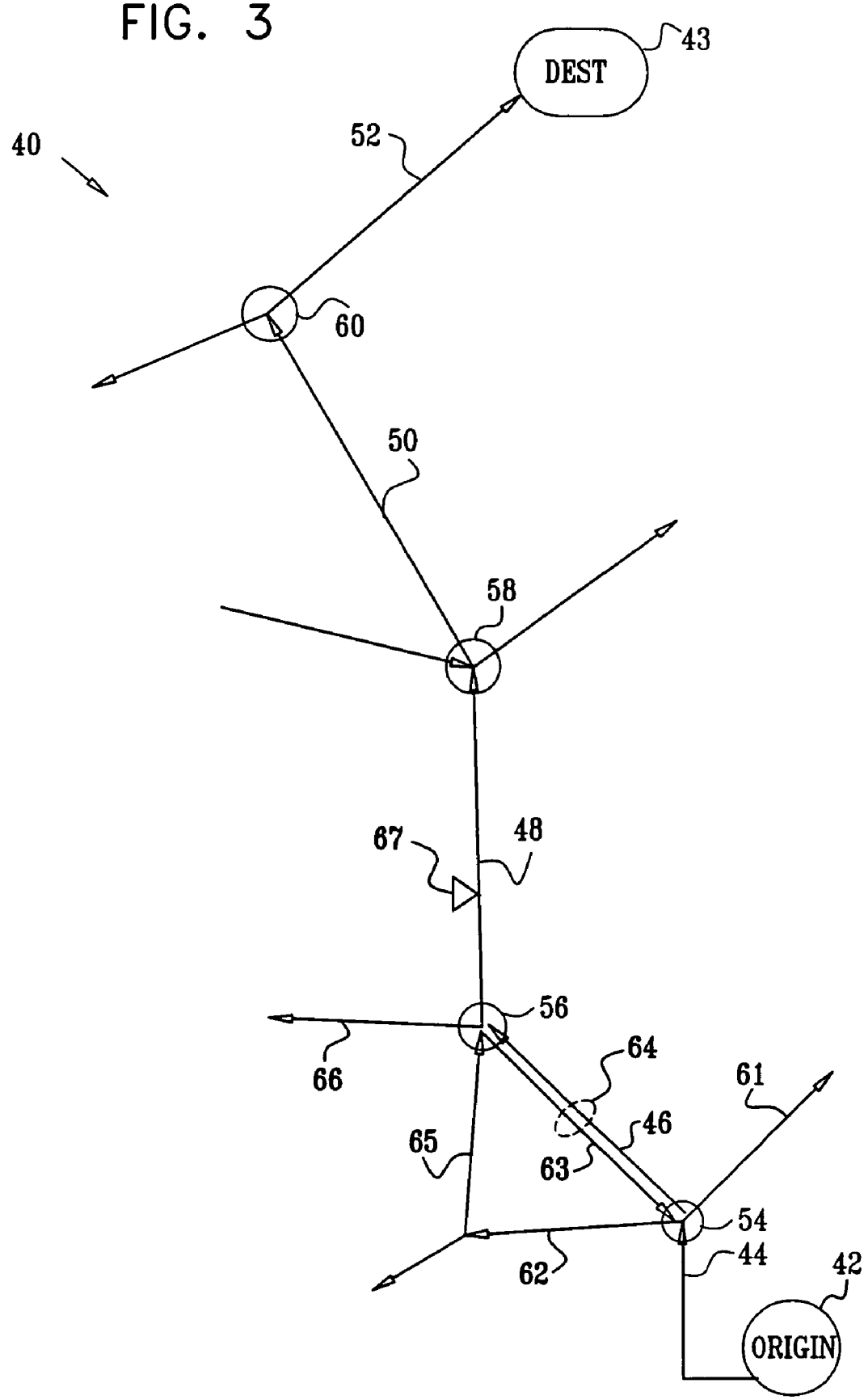
FIG. 3 is a graph that schematically illustrates elements of a route corridor map generated by a mobile device based on map data furnished by a mapping server, in accordance with an embodiment of the present invention.

FIG. 3 is a graph that schematically illustrates a route 40 generated by server 28, in accordance with an embodiment of the present invention. This figure also shows aspects of a route corridor map for route 40, as described below with reference to the figures that follow. Route 40 has the form of a directed polyline, comprising a sequence of links 44, 46, 48, 50, 52 that connect a route origin 42 to a destination 43. The links correspond to roads, which run between junctions 54, 56, 58, 60 and the origin and destination nodes. The junctions typically correspond to road intersections or interchanges. Route 40 may also comprise an identification of side roads that intersect the designated route at the junctions, represented in FIG. 3 by links 61, 63, 65 and 66. Other road features and landmarks along the route may be identified, as well.

Construction of route 40 by server 28 is described generally in the above-mentioned U.S. patent application Ser. No. 10/426,946. To summarize briefly, client device 24 submits a route request that specifies various input data, such as the starting location (provided by manual input or automatically, by GPS 26, for example) and destination, as well as any interim locations to be passed along the route. The user may also specify a choice of optimal route type (shortest, fastest or simplest), as well as the transport type (car, truck, bicycle, pedestrian), and any road types to avoid (for example, toll roads). The server then computes the route, using any suitable automatic routing algorithm known in the art, such as the A*, Floyd-Warshall or Dijkstra algorithm. Such algorithms are described, for example, by Cherkassky et al., in "Shortest Path Algorithms: Theory and Experimental Evaluation," Technical Report 93-1480, Department of Computer Science, Stanford University (Stanford, Calif., 1993), which is incorporated herein by reference.

The methods of constructing and downloading route 40 provided by embodiments of the present invention differ from methods known in the art in a number of important particulars. In mapping systems known in the art, road data are represented in terms of road segments and nodes, wherever two or more segments meet. Route 40, however, is build up from directed segments, referred to herein as links. In other words, as shown in FIG. 3, a segment 64 of a two-way road comprises two links, such as links 46 and 63 shown in the figure. Each link corresponds to a data structure that includes, in addition to a respective origin and end point, other data fields computed by server 28 in the course of constructing the route and indicating characteristics of the link, for example:

Link index (or link ID). Note that the indices of opposing links belonging to the same two-way road segment are keyed so that client device 24 draws only a single road when rendering a map containing the links.

A pointer to the next link along the optimal route to destination 43 (except for the final link, in which the pointer is null). Thus, link 46 will contain a reference to link 48. Link 62, on the other hand (where the driver may find himself in the event of a wrong turn at junction 54) will contain a pointer to link 65. This aspect of the link structure facilitates instantaneous rerouting in the event that the driver leaves the original route, without the need for additional computations.

Route change prompts 67. These prompts comprise instructions to the mapping program on client device 24 to contact server 28 for possible changes to route 40 during the trip. Such changes may occur, for example, due to changing traffic conditions of which the server is informed. Prompts 67 may be placed anywhere along the route, but are most commonly located shortly before decision points (such as whether to take a given bridge or a tunnel to cross a river). Typically, each prompt 67 causes the client device to send a HTTP request to the server. Although it would also be possible for the server to push updates to the client, this sort of functionality is not supported by the HTTP client/server environment. Strategic placement of prompts 67 along the route ensures that the client device will receive timely information, without wasting bandwidth on unnecessary communications.

Distance and time to destination, to be shown on display 30 (as in the lower right corner of FIG. 2, for example).

Other landmarks, buildings and features of interest along the route (not shown in the figures).

An exemplary listing of link and segment data structures, which include some of the data fields described above, is provided in Appendix A.

Based on the computed route, server 28 may build a list of maneuvers that will be required along the route. Each maneuver indicates an action to be taken by the user of client device 24 at one of the junctions along the route. The list of maneuvers is downloaded to the client device along with the route itself. The client program on client device 24 may use the information in the maneuver list to prepare suitable verbal instructions for the user (for example, "right turn in 300 m," followed by "right turn in 50 m," followed by "now turn right") Alternatively, based on the next-link pointers provided as part of route 40, the client device may generate the instructions itself.

Figure 4:
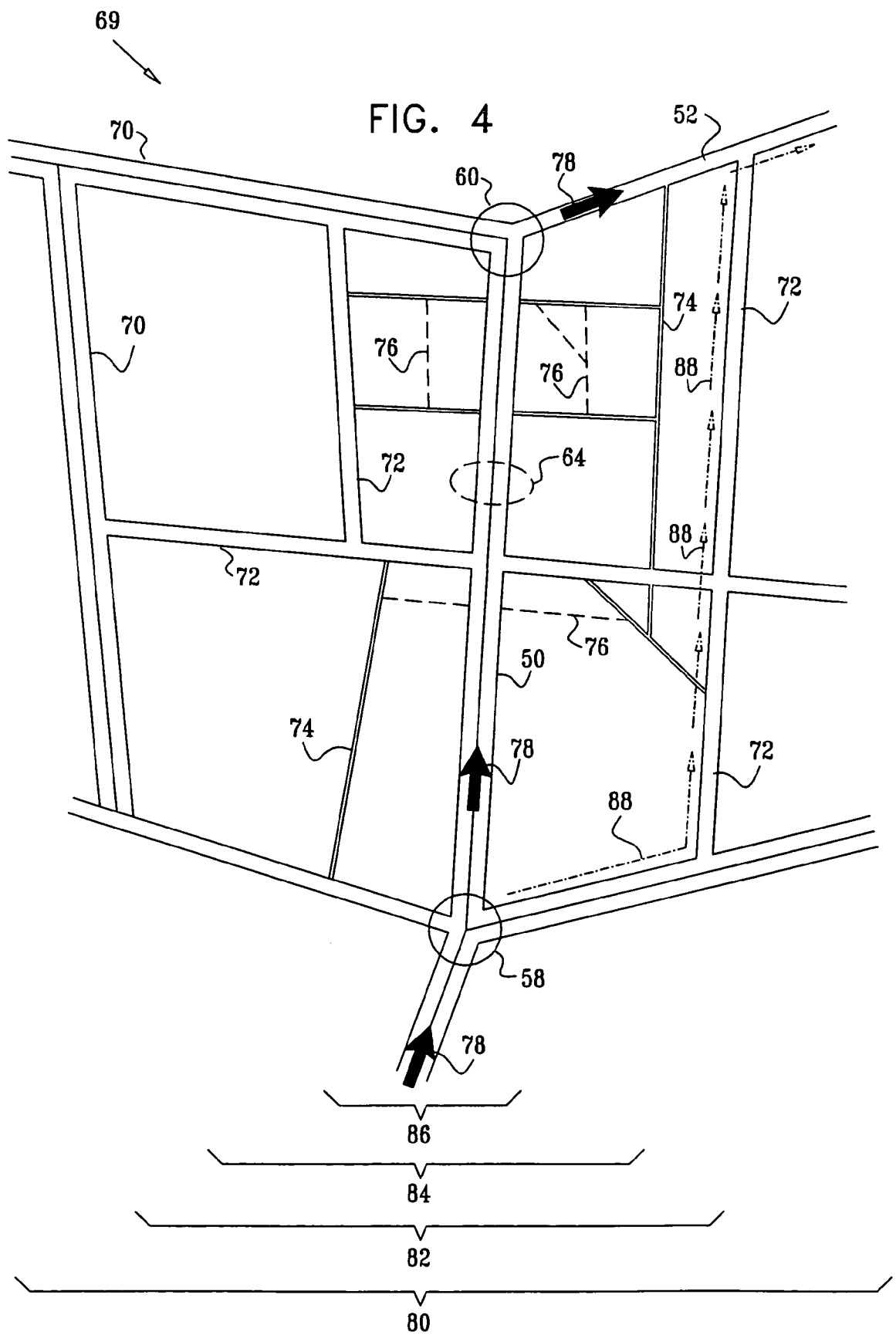
FIG. 4 is a schematic representation of a segment of a route corridor map, in accordance with an embodiment of the present invention.

To accompany the route itself, server 28 generates a corridor map containing the route. As shown in the figures that follow, the corridor map is actually made up the road segments corresponding to links 44, 46, 48, 50, 52 of route 40, along with certain roads on either side of the route. The map contents are downloaded incrementally to client device 24 as vehicle 22 proceeds along route 40, typically as described hereinbelow with reference to FIG. 8, and are rendered by the client device to display 30. The actual boundaries of the road data contained in the corridor map are variable, and the corridor may have different widths for different types of roads. This feature of the present invention is illustrated in FIG. 4. In rendering a given segment of the corridor map to display 30, client device 24 may show the entire width of the corridor, including all roads in the map, or it may show only a portion of the segment map depending on the zoom factor used in rendering the map at any given point. In the map shown in FIG. 2, for example, a high zoom factor (high magnification) is used in order to present details of a junction at which a maneuver is to take place.

Thus, to summarize, the route and corridor map data downloaded by server 28 to client device 24 permit the client device to perform a number of different mapping and guidance functions, including:
 Full map rendering.
 Rendering of maneuver maps (as shown in FIG. 2).
 Instruction building.
 Local rerouting in case of deviation from the route.
 Dynamic route updates.
 Map matching—correction of errors in reading of GPS receiver 26 so as to determine the precise location of vehicle 22 on one of the links in the route.

Methods of map matching are described further in the above-mentioned U.S. patent application Ser. No. 10/426,946. Thus, although the methods and data structures described above are particularly useful in relation to downloading and rendering of corridor maps, it will be understood that these methods and data structures are useful in other aspects of navigation and map rendering, as well.

FIG. 4 is a schematic, enlarged view of a segment 69 of the corridor map corresponding to route 40, in accordance with an embodiment of the present invention. The segment map in this example contains roads of four types: high-speed, limited-access roads 70 (type 0), highways 72 (type 1), primary local roads 74 (type 2) and secondary local roads (type 3). These types of roads have been chosen solely by way of example, and server 28 may alternatively be configured to handle a larger number of road types. Link 50 of route 40 within segment map 69 follows a type 0 road between junctions 58 and 60, as shown by arrows 78.

Segment map 69 includes all roads of each type that are accessible from link 50 and are within a certain maximum distance of the route segment. The "distance" of a given road from link 50 is typically measured as the road distance from the link to the closest point on the given road. Alternatively, other distance measures may be used. The maximum distance that is used to determine which roads to include in the segment map depends on the type of road. Typically, the maximum distance varies inversely with the expected road speed, i.e., the lower the type number (in the typing scheme described above), the larger the distance. Thus, all type 0 roads that fall within a large distance 80 of link 50 are included in segment map 66. Types 1, 2 and 3 roads are included only if they fall within successively smaller distances 82, 84, 86 of link 50.

By virtue of including side roads in segment map 69 in this manner, it is possible for server 28 to compute alternate routes to destination 43, for use in case vehicle 22 deviates from the original route. Such alternate routes are not limited to returning the vehicle to the route segment from which it deviated, but may rather direct the user along another, parallel route that has become the optimal route (over all the roads included in the corridor map) in view of the deviation from the original route. Thus, for example, the server may precompute an alternate route 88, to be taken in case vehicle 22 takes a wrong turn at junction 58. The results of the alternate route computation may be recorded in the next-link pointers of the links along route 88, as described above. Client device 24 will then prompt the user to proceed along road 72 in order to rejoin the original route at the next link 52.

Figure 5:
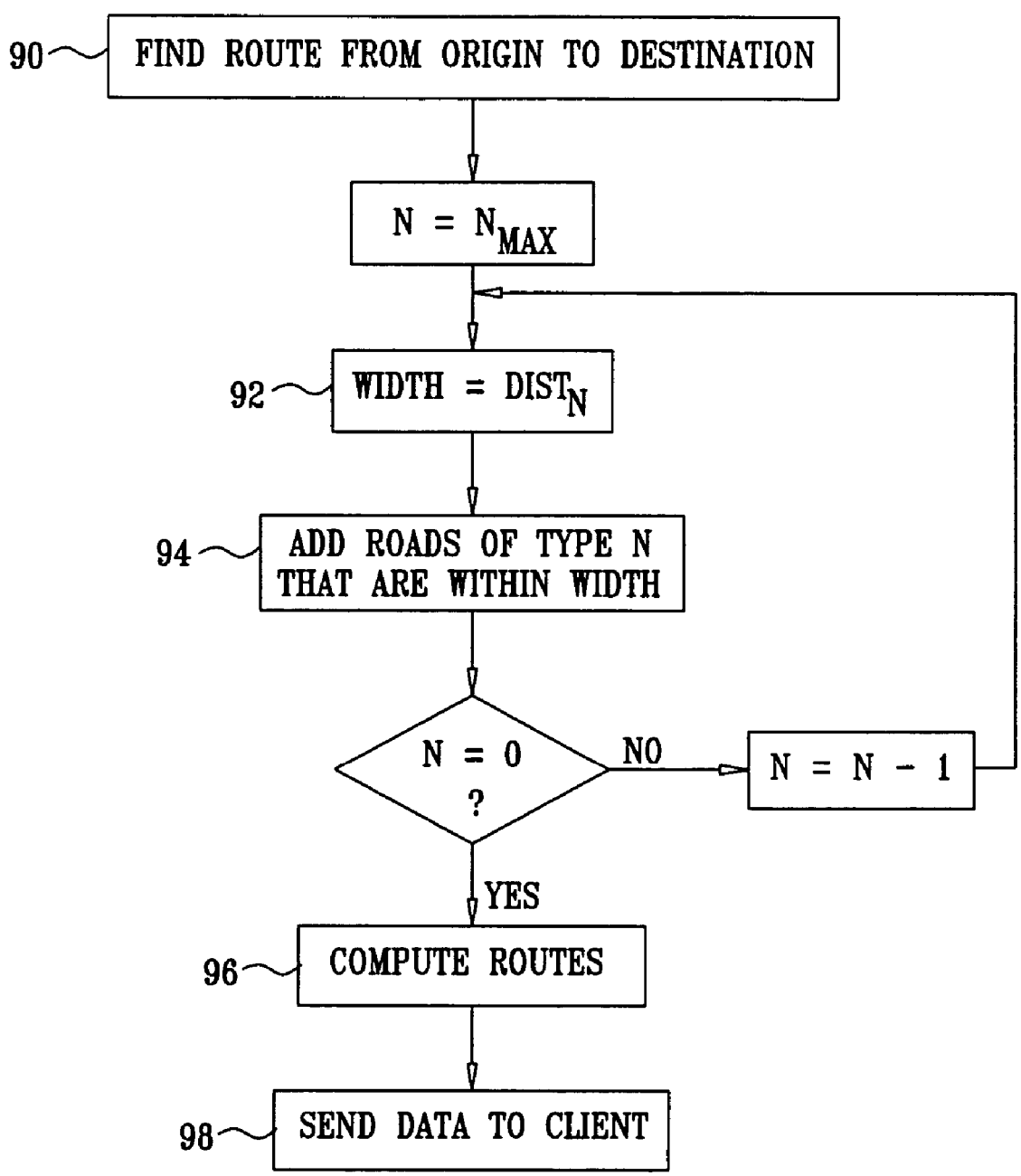
FIG. 5 is a flow chart that schematically illustrates a method for generating a route corridor map in accordance with an embodiment of the present invention.

FIG. 5 is a flow chart that schematically illustrates a method for generating a route corridor map, in accordance with an embodiment of the present invention. Server 28 receives a route request input from the client device, and computes an optimal route from origin 42 to destination 43, at a route computation step 90. This step may use any suitable routing algorithm known in the art, as described above. In the succeeding steps, for each link in the route, the server adds roads of each different type that are in the vicinity of the route. In the present example, the types are identified as type 0 (fastest) through type $N_{MAX}$ (slowest). The server in this example begins from the slowest type.

For each road type, the server sets the corridor width equal to a maximum distance measure chosen for that road type, $DIST_N$, at a width setting step 92. This distance, as noted above, represents the road distance from the route to the nearest point on the road in question. For example, given road types 0 through 5, the widths may be set as follows:
 $DIST_5 = 200$ m
 $DIST_4 = 500$ m
 $DIST_3 = 1000$ m
 $DIST_2 = 2000$ m
 $DIST_1 = 10$ km
 $DIST_0 = 50$ km It will be understood that these values are shown here by way of example, and it is similarly possible to use a larger or smaller number of road types, and larger or smaller maximum distances. The distance values may be set separately for different segments of route 40, depending on the density of side roads in the vicinity of each route segment and/or the type of road along which the route runs in each segment, for example. Furthermore, the maximum distances may be varied adaptively, as described below with reference to FIG. 6.

For each road type N, server 28 collects all roads that are within $DIST_N$ of the route, at a road collection step 94. For this purpose, the server typically searches its own database of map data. Either a breadth-first or a depth-first search may be used. Optionally, a maximum data size for each map segment may be set, and further roads may be added to the map segment if it has not reached this maximum size after collecting the roads of all types on a first pass through step 94. In this case, for example, the maximum distances $DIST_N$ for some or all of the road types may be increased, and step 94 may then be repeated. Alternatively, step 94 may be repeated iteratively with respect to the roads added in the first pass through step 94, so as to add further roads of some or all of the types that are within the respective maximum distances of the roads added in the first pass. Such iterations may continue until the data size of the map segment reaches the maximum data size, or until there are no more roads to add to the map segment.

After it has finished adding all appropriate roads to the corridor map, server 28 optionally computes alternate routes to destination 43 over these added roads, at an alternate routing step 96. The same routing algorithms that were used at step 90 may be used at step 96, as well. Each such route starts from one of the roads added at step 94 (represented as a link with a given direction heading), and finds an optimal path to destination 43 over any of the roads in the corridor map, not necessarily on the original route 40. Route 88 (FIG. 4) is one example of such an alternate route.

After the complete corridor map has been constructed, server 28 downloads the map data to client device 24, at a download step 98. Typically, the server downloads the map data gradually, in order not to overload the limited memory capacity of the client device and to use the available wireless bandwidth efficiently. Details of download step 98 are described hereinbelow with reference to FIG. 8. The client device then displays the appropriate map segment, along with the applicable driving instructions, as the vehicle travels over the segment.

FIG. 6 is a flow chart that schematically illustrates a method for determining variable maximum distances, $DIST_N^*$, for use at steps 92 and 94 of the method of FIG. 5, in accordance with an embodiment of the present invention. In general, users of system 20 are likely to deviate from the routes determined by server 28 only at junctions along the route, and most commonly in complex junctions and junctions at which the user must make a complex maneuver. Therefore, the method of FIG. 6 permits the route corridor to be widened adaptively in the vicinity of such junctions, by increasing $DIST_N^*$ for some or all of the road types 0 through $N_{Max}$.

Server 28 scans each link along route 40 that it has determined in order to determine where the junctions along the route are located, at a junction location step 100. If a link contains so significant junction, server 28 simply uses the default $DIST_N$, at a default step 102.

Upon locating a junction, server 28 calculates a junction complexity score, at a junction scoring step 104. This score reflects the topological complexity of the junction itself. Factors that affect the junction complexity score include, for example:

Size of the junction.

The number of incoming and outgoing roads in the junction.

The number of different lanes in the road.

The angle difference between the destination road (on which the user is to exit the junction) and the roads neighboring the destination road.

The angle of the destination road relative to the road on which the user enters the junction. (This element of the score depends on how well the angle of the destination road matches the user's intuitive perception of the maneuver instruction to be given at the junction. For example, if a turn onto the destination road is required, how close is the turn to 90°? If no turn is required, is the destination road straight relative to the entry road, or does it turn?)

How major is the destination road compared to the other outgoing roads from the junction.

Other scoring factors will be apparent to those skilled in the art. The junction score is determined by an empirical formula, typically based on the points above.

Server 28 next calculates a maneuver complexity score for the junction, at a maneuver scoring step 106. This score is defined by the type of action the user must perform at the junction, and the conditions under which the action is to be taken. For example, simple maneuvers such as "continue straight," or "at the end of the road turn right/left," may get the lowest complexity grade. Maneuvers such as "turn right/left" or "keep right/left" or simple entry to or exit from a traffic circle may get a higher complexity grade, while complex maneuvers such as "make a U-turn" or negotiating complicated traffic circles and interchanges may get a still higher grade.

Conditions that may affect the complexity score include, for example, the driving speed during the maneuver, whether the user is driving in daylight or at night, and the distances between the previous maneuver and the current maneuver, and between the current maneuver and the next one. Closely-spaced maneuvers become inherently more complex. For instance, "turn right and the immediately right again" is a highly-complex maneuver, although it is made up of two maneuvers that are themselves of only intermediate complexity. The maneuver complexity score is determined by the inherent complexity of the maneuver type, weighted by any conditions that make the maneuver more difficult.

Server 28 calculates the total junction score, at a distance determination step 108. The total score is found by combining the junction complexity and maneuver complexity scores found at steps 104 and 106, typically by taking a weighted sum or mean of the scores. The maximum distances, $DIST_N^*$, to be used in collecting different road types are determined by increasing the default distances, $DIST_N$, by an amount that depends on the total junction score—the greater the score, the larger $DIST_N^*$. Construction of the corridor map then proceeds at step 94 using the increased distances.

FIG. 7 is a corridor map 110 constructed in accordance with an embodiment of the present invention, using the procedures described above. Route 40 is shown as a bold line, leading from origin 42 to destination 43. The corridor surrounding the route contains side roads 112, 114, 116 of different types. Note the variation in corridor width along the length of the route.

FIG. 8 is a flow chart that schematically shows details of download step 98 (FIG. 5), in accordance with an embodiment of the present invention. The method of FIG. 8 is designed to permit the driver of vehicle 22 to start out along route 40 within a short time of requesting the route—typically less than 10 sec, and to provide the required map data to client device 24 gradually as the vehicle proceeds along the route. In other words, the order of downloading the map data is chosen so that the "graphic horizon," i.e., the level of available detail, advances along the route ahead of the vehicle, and the client device has detailed information available when needed. These objectives are met within the constraints of the narrow-bandwidth wireless link between the client device and the server.

After computing route 40 and the route corridor, server 28 performs a breadth-first search to collect all road segments that are connected to origin 42 of the route, at an origin searching step 122. The server downloads the map data with respect to these nearby road segments so that the client device can provide the driver with a complete map of his initial surroundings before he starts traveling. As noted above, steps 120 and 122 are typically completed within about 10 sec or less of submission of the route request by the user. The detailed local map-provided following step 122 is useful in avoiding initial driver errors that are very common at the beginning of the route.

Server 28 then sorts the remaining road segments in the corridor map (which it has typically assembled in accordance with the method of FIG. 5 described above) according to the distance of the segments from the current location of vehicle 22, at a distance sorting step 124. Typically, the distance can be measured either in Cartesian terms or in terms of road distance to each segment. The sort may be updated from time to time as the vehicle travels along the route. The server then streams the map data to client device 24 according to the sort order, starting from the segments closest to the current vehicle location, at a data streaming step 126. Typically, the server streams the data continuously until the entire corridor map has been downloaded to the client device. Alternatively, if the memory of the client device is insufficient to hold the entire corridor map, or if bandwidth constraints make continuous streaming impractical, the server may download the map data in pieces, in response to the location of the vehicle along the route.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX A

LINK AND SEGMENT DATA STRUCTURES

```
/**
 * <b>Title:</b>
 * Link<br>
 * <b>Description:</b>
 * Class describing all directional data of a segment.
 * Each <code>Link</code> object is tightly related to a
 * <code>Segment</code> object. <code>Link</code> object
 * holds road connectivity data.
 * <br>
 */
public class Link
{
    /**
     * ID of the segment to which this link relates.
     */
    public int m_segID;
    /**
     * ID of this link. If this link is in the related
     * segment's geometry direction, then
     *<code>m_linkID</code> equals <code>m_segID</code>.
     * Else, <code>m_linkID</code> equals <code>m_segID
     * -1</code>.
     */
    public int m_linkID;
    /**
     * Number of successors.
     */
    public int m_numSuccessors;
    /**
     * ID's for successors of this link.
     * ID's are of <code>Link</code> object.
     * <code>m_numSuccessors</code> should be considered
     * as the array's length.
     */
```

APPENDIX A-continued

LINK AND SEGMENT DATA STRUCTURES

```
    public int[ ] m_successors;
    /**
     * Determines if successor is physically connected
     * to this link (are the roads 'touching', or is it
     * a bridge or a tunnel) .
     * <code>m_numSuccessors</code> should be considered
     * as the array's length.
     */
    public boolean[ ] m_isPhysicallyConnected;
    /**
     * Determines if successor is legally accessible
     * from this link.
     * <code>m_numSuccessors</code> should be considered
     * as the array's length.
     */
    public boolean[ ] m_isAccessible;
    /**
     * ID of the next link on this route.
     */
    public int m_nextLink;
    /**
     * Instruction code for the instruction from this
     * link to the link described by
     * <code>m_nextLink</code>.
     */
    public byte m_instructions;
    /**
     * Distance to route's destination (in meters) from
     * the beginning of this segment; -1 if link doesn't
     * reach destination or no route available.
     */
    public int m_distanceToDestination;
    /**
     * Estimated time to destination (in seconds) from
     * the beginning of this segment; -1 if link doesn't
     * reach destination or no route available.
     */
    public int m_timeToDestination;
    /**
     * Indicates if link is part of the main route
     * calculated by the server around which corridor is
     * built.
     */
    public boolean m_isMainRoute;
    /**
     * Indicates whether this link is a full link,
     * meaning its <code>m_nextLink</code>,
     * <code>m_instructions</code>,
     * <code>m_distanceToDestination</code>, and
     * <code>m_timeToDestination</code> are valid.
     */
    public boolean m_isFullLink;
    /**
     * Indicates whether vehicle can navigate on this
     * link.
     */
    public boolean m_isNavigable;
    /**
     * Indicates whether this link is at the border of
     * the corridor.
     */
    public boolean m_isBorder;
    /**
     * Indicates whether this link has a physical
     * divider (e.g.: a fence)at its end. If a link has
     * a physical divider then all its left (in UK:)
     * right successors that are not accessible should
     * be considered blocked by the divider.
     */
    public boolean m_hasPhysicalDivider;
}
/**
 * <b>Title:</b>
 * Segment<br>
 * <b>Description:</b>
 * Class describing a segment on the road grid. A segment
 * is defined as part of a road between two consecutive
```

APPENDIX A-continued

LINK AND SEGMENT DATA STRUCTURES

```
 * intersections. Intersections can be physical or not
 * (bridges, tunnels). Segment may also start or end if
 * road's name is changed. This class holds all the
 * geographical & visual data of the segment, that is not
 * direction-dependant.
 * <br>
 */
public class Segment
{
  public static final int INVALID_ID = 0;
  /**
   * Road types
   */
  public static final byte
    RT_FIRST_VALUE = 1,
     * indicates value of first road type
    RT_MAJOR_HIGHWAY       = 1,
    RT_HIGHWAY             = 2,
    RT_SECONDARY_HIGHWAY   = 3,
    RT_MAIN_ROAD           = 4,
    RT_STREET              = 5,
    RT_PEDESTRIAN          = 6,
    RT_LAST_VALUE          = 7
     * indicates the value of last road type + 1
  /**
   * Visual types
   */
  public static final byte
    VT_NORMAL      = 0,
    VT_TUNNEL      = 1,
    VT_FERRY       = 2,
    VT_BRIDGE1     = 3,
    VT_ROUNDABOUT  = 4,
    VT_RAMP        = 5,
    VT_CONNECTOR   = 6,
    VT_BRIDGE2     = 7,
    VT_BRIDGE3     = 8,
    VT_UNDERPASS   = 9;
  public static final int SEG_ID_MASK = 0x7FFFFFFF;
  /**
   * ID of this segment.
   * ID is unique in a route scope.
   */
  public int m_segID;
  /**
   * Geometry of this segment.
   * Contains all the 'X' values of the polyline
   * points, in meters, relative to route's origin
   * point. Array is not necessarily full - there may
   * be some junk data at its end. Actual number of
   * relevant points is <code>m_nPoints</code>.
   */
  public int[ ] m_xPoints;
  /**
   * Geometry of this segment.
   * Contains all the 'Y' values of the polyline
   * points, in meters,relative to route's origin
   * point. Array is not necessarily full - there may
   * be some junk data at its end. Actual number of
   * relevant points is <code>m_nPoints</code>.
   */
  public int[ ] m_yPoints;
  /**
   * Actual number of points in <code>m_xPoints</code>
   * and <code>m_yPoints</code> (must be identical).
   */
  public int m_nPoints;
  /**
   * Distance at segment-start (in meters) which is
   * actually part of the junction.
   */
  public int m_startPointMargin;
  /**
   * Distance at segment-end (in meters) which is
   * actually part of the junction.
   */
  public int m_endPointMargin;
```

APPENDIX A-continued

LINK AND SEGMENT DATA STRUCTURES

```
  /**
   * Reference to labels char array. Segment's name is
   * in this array, from index
   * <code>m_labelStart</code> until the null
   * terminator.
   */
  public byte[ ] m_label;
  /**
   * Starting position of label within
   * <code>m_label</code>.
   */
  public int m_labelStart;
  /**
   * Indicates whether this segment is a 'black-
   * segment', meaning segment
   * with highly generalized geometry.
   */
  public boolean m_isBlackSeg;
  /**
   * Link related to this segments, with the same
   * direction as this segment's geometry. May be
   * null if link in that direction doesn't exist.
   */
  public Link m_forwardLink = null;
  /**
   * Link related to this segments, with a direction
   * opposite to this segment's geometry. May be
   * null if link in that direction doesn't exist.
   * */
  public Link m_backwardLink = null;
  /**
   * Default constructor
   */
}
```

The invention claimed is:

1. A method for displaying a map on a mobile client device, the method comprising:
   storing map data on a server, the map data comprising road data with respect to roads of multiple different road types;
   determining a route from a starting point to a destination within an area covered by the map data, the route comprising one or more route segments;
   defining a corridor map on the server, the corridor map comprising the route segments and the roads of the different road types that are within different, respective distances, determined by the road types, of the route segments;
   downloading the road data with respect to the route segments and the roads of the different road types comprised in the corridor map from the server to the client device; and
   rendering on the client device, using the downloaded road data, one or more images, each image comprising at least a respective portion of the corridor map.

2. The method according to claim 1, wherein determining the route comprises determining the route along which a user of the client device is to travel, and wherein rendering the images comprises rendering the images in a succession as the user travels along the route.

3. The method according to claim 2, wherein rendering the images comprises finding position coordinates of the user using a location providing device associated with the client device, and displaying the images together with a navigation aid based on the position coordinates.

4. The method according to claim 3, wherein finding the position coordinates comprises receiving an initial location reading from the location providing device, and matching the initial location reading to the downloaded road data in order to find the position coordinates with respect to the corridor map.

5. The method according to claim 2, wherein downloading the road data comprises streaming the road data to the client device as the user travels along the route.

6. The method according to claim 1, wherein downloading the portion of the map data comprises downloading the map data over a wireless link.

7. The method according to claim 6, wherein the client device comprises at least one of a cellular telephone and a personal digital assistant (PDA), which communicates with the server over a cellular telephone network that comprises the wireless link.

8. The method according to claim 6, wherein downloading the road data comprises downloading, together with the road data, a prompt associated with at least one of the route segments, so as to cause the client device to request updated information from the server as a user of the client device travels over the route in a vicinity of the at least one of the route segments.

9. The method according to claim 1, wherein a classification of the roads into the different road types corresponds to expected speeds of travel on the roads.

10. The method according to claim 9, wherein the road types comprise at least first and second road types, the first road type having a higher expected speed of travel than the second road type, and
wherein defining the corridor map comprises incorporating in the map segments the roads of the first and second road types that are within respective first and second distances of the route segments, such that the first distance is greater than the second distance.

11. The method according to claim 1, wherein the road types comprise highways and local streets, and
wherein defining the corridor map comprises incorporating in the map segments the highways that are within a first distance of the route segments and the local streets that are within a second distance of the route, such that the first distance is greater than the second distance.

12. The method according to claim 1, wherein determining the route comprises identifying junctions along the route, and associating respective measures of complexity with the junctions, and
wherein defining the corridor map comprises modifying the respective distances responsively to the measures of complexity.

13. The method according to claim 12, wherein modifying the respective distances comprises increasing the respective distances in a vicinity of the junctions that are characterized as complex junctions.

14. The method according to claim 12, wherein associating the respective measures of complexity comprises determining a junction complexity score for each junction responsively to a topology of the junction.

15. The method according to claim 12, wherein determining the route comprises defining maneuvers to be performed at the junctions along the route, and wherein associating the respective measures of complexity comprises determining a maneuver complexity score for each maneuver.

16. The method according to claim 1, wherein defining the corridor map comprises identifying junctions at which the roads comprised in the one or more map segments intersect with further roads of the different road types that are not within the respective distances, and adding one or more of the further roads to the one or more map segments.

17. The method according to claim 1, wherein determining the route comprises determining the route along which a user of the client device is to travel, and wherein defining the corridor map comprises determining a respective path to the destination from each of at least some of the roads comprised in each of the map segments, and comprising downloading the respective path to the client device in order to guide the user to the destination in the event of a deviation from the route onto one of the at least some of the roads.

18. The method according to claim 17, wherein downloading the respective path comprises associating with each of the roads in the corridor map a pointer to a subsequent road along the respective path, and downloading the pointer to the client device.

19. The method according to claim 1, wherein the corridor map has a width that is defined at each point along the route by an extent of the roads of the different road types that are comprised in the corridor map in a vicinity of the point, and wherein the width of the corridor map varies along the route responsively to the extent of the roads.

20. The method according to claim 1, wherein downloading the road data comprises sorting the roads according to a respective distance of each of the roads from a location of the client device, and downloading the road data with respect to the roads in an order responsive to the distance.

21. The method according to claim 20, wherein downloading the road data comprises streaming the road data to the client device in the order responsive to the distance as a user of the client device travels along the route.

22. The method according to claim 1, wherein downloading the road data comprises downloading data structures that represent the roads, each data structure indicating a directional link.

23. The method according to claim 22, wherein each data structure comprises one or more data fields indicating characteristics of the directional link selected from a group of characteristics consisting of a next link along an optimal route to the destination, a distance to the destination, and a time required to travel to the destination.

24. A method for displaying a map on a mobile client device, the method comprising:
storing map data on a server;
determining a route at the server from a starting point to a destination within an area covered by the map data, the route comprising a sequence of the directional links, in which each directional link is represented by a data structure containing a pointer to a succeeding directional link along the route;
downloading the route from the server to the client device; and
rendering on the client device, using the downloaded route, a map indicative of the route.

25. The method according to claim 24, and comprising generating navigation instructions for a user of the client device based on the pointer in one or more of the data structures.

26. The method according to claim 25, wherein rendering the map comprises rendering a maneuver map responsively to the navigation instructions.

27. The method according to claim 25, and comprising defining a corridor map on the server, the corridor map comprising the route and further directional links corresponding to other roads included in the map data in a vicinity of the route, and wherein generating the navigation instructions comprises guiding the user to the destination, responsively to the pointer in one or more of the data structures corresponding to the other roads, in the event of a deviation from the route onto one of the other roads.

28. The method according to claim 24, wherein rendering the map comprises rendering a single road segment to represent two of the directional links corresponding to opposing directions of travel on the single road segment.

29. The method according to claim 24, wherein the data structure representing each directional link comprises a field indicating at least one of a distance to the destination and a time to the destination from a location associated with the directional link.

30. The method according to claim 24, wherein the data structure representing at least one of the directional links comprises a prompt, so as to cause the client device to request updated information from the server as a user of the client device travels over the route at a location associated with the directional link.

31. The method according to claim 24, and comprising defining a corridor map on the server, the corridor map comprising the route and other roads included in the map data in a vicinity of the route, wherein downloading the route comprises sorting the other roads in the corridor map according to a respective distance of each of the roads from a location of the client device, and downloading the map data with respect to the other roads in an order responsive to the distance.

32. The method according to claim 31, wherein downloading the map data comprises streaming the map data to the client device in the order responsive to the distance as a user of the client device travels along the route.

33. The method according to claim 32, wherein downloading the map data comprises performing a breadth-first search of the other roads connecting to the starting point of the route, and downloading the map data with respect to the roads found by the breadth-first search immediately after defining the corridor map.

34. A method for displaying a map on a mobile client device, the method comprising:
storing map data on a server;
determining a route at the server from a starting point to a destination within an area covered by the map data, the route comprising a sequence of route segments;
associating a prompt with at least one of the route segments, so as to cause a client device to request updated information with respect to the route as a user of the client device travels over the route at a location associated with the at least one of the route segments;
downloading the route segments from the server to the client device;
rendering on the client device, using the downloaded route segments, a map indicative of the route; and
responsively to the prompt, receiving a request from the client device for the updated information, and providing the updated information with respect to the route.

35. The method according to claim 34, wherein downloading the route segments comprises downloading data to the client device over a wireless link, and wherein receiving the request comprises receiving a communication initiated by the client device over the wireless link.

36. The method according to claim 35, wherein receiving the communication comprises receiving a Hypertext Transfer Protocol (HTTP) request, and wherein providing the updated information comprises sending a HTTP response.

37. The method according to claim 34, wherein providing the updated information comprises informing the client device of a change in the route.

38. Apparatus for displaying a map on a mobile client device, the apparatus comprising:
a memory, which is arranged to store map data, comprising road data with respect to roads of multiple different road types; and
a server, which is adapted to determine a route from a starting point to a destination within an area covered by the map data, the route comprising one or more route segments, and which is adapted to define a corridor map comprising the route segments and the roads of the different road types that are within different, respective distances, determined by the road types, of the route segments, and to download the road data with respect to the route segments and the roads of the different road types comprised in the corridor map to the client device so as to enable the client device, using the downloaded road data, to render one or more images, each image comprising at least a respective portion of the corridor map.

39. The apparatus according to claim 38, wherein the server is adapted to determine the route along which a user of the client device is to travel, and to download the map segments one after another in sequence as the user travels along the route.

40. The apparatus according to claim 38, wherein the server is coupled to download the road data to the client device over a wireless link.

41. The apparatus according to claim 38, wherein a classification of the roads into the different road types corresponds to expected speeds of travel on the roads.

42. The apparatus according to claim 41, wherein the road types comprise at least first and second road types, the first road type having a higher expected speed of travel than the second road type, and
wherein the server is adapted to incorporate in the map segments the roads of the first and second road types that are within respective first and second distances of the route segments, such that the first distance is greater than the second distance.

43. The apparatus according to claim 38, wherein the road types comprise highways and local streets, and
wherein the server is adapted to incorporate in the map segments the highways that are within a first distance of the route segments and the local streets that are within a second distance of the route, such that the first distance is greater than the second distance.

44. The apparatus according to claim 38, wherein the server is adapted to identify junctions along the route, and to associate respective measures of complexity with the junctions, and to modify the respective distances responsively to the measures of complexity.

45. The apparatus according to claim 44, wherein the server is adapted to increase the respective distances in a vicinity of the junctions that are characterized as complex junctions.

46. The apparatus according to claim 44, wherein the respective measures of complexity comprise a junction complexity score that is determined for each junction responsively to a topology of the junction.

47. The apparatus according to claim 44, wherein the server is adapted to define maneuvers to be performed at the junctions along the route, and wherein the respective measures of complexity comprise a maneuver complexity score for each maneuver.

48. The apparatus according to claim 38, wherein the server is adapted to identify junctions at which the roads comprised in the one or more map segments intersect with further roads of the different road types that are not within the respective distances, and to add one or more of the further roads to the one or more map segments.

49. The apparatus according to claim 38, wherein the server is adapted to determine the route along which a user of the client device is to travel, and to determine a respective path to the destination from each of at least some of the roads comprised in each of the map segments, and to download the respective path to the client device in order to guide the user to the destination in the event of a deviation from the route onto one of the at least some of the roads.

50. The apparatus according to claim 49, wherein the server is adapted to associate with each of the roads in the corridor map a pointer to a subsequent road along the respective path, and to download the pointer to the client device.

51. The apparatus according to claim 38, wherein the corridor map has a width that is defined at each point along the route by an extent of the roads of the different road types that are comprised in the corridor map in a vicinity of the point, and wherein the width of the corridor map varies along the route responsively to the extent of the roads.

52. The apparatus according to claim 38, wherein the server is adapted to sort the roads according to a respective distance of each of the roads from a location of the client device, and to download the road data with respect to the roads in an order responsive to the distance.

53. Apparatus for displaying a map on a mobile client device, the apparatus comprising:
a memory, which is arranged to store map data;
a server, which is adapted to determine a route from a starting point to a destination within an area covered by the map data, the route comprising a sequence of the directional links, in which each directional link is represented by a data structure containing a pointer to a succeeding directional link along the route, and to download the route to the client device, so as to enable the client device, using the downloaded route, to render a map indicative of the route.

54. The apparatus according to claim 53, and comprising the client device, which is adapted to render the map and to generate navigation instructions for a user of the client device based on the pointer in one or more of the data structures.

55. The apparatus according to claim 54, wherein the map comprises a maneuver map, which is generated by the client device responsively to the navigation instructions.

56. The apparatus according to claim 54, wherein the server is adapted to define a corridor map, comprising the route and further directional links corresponding to other roads included in the map data in a vicinity of the route, and wherein the client device is adapted to guide the user to the destination, responsively to the pointer in one or more of the data structures corresponding to the other roads, in the event of a deviation from the route onto one of the other roads.

57. The apparatus according to claim 54, and comprising a location providing device, associated with the client device, for providing position coordinates of the user, wherein the client device is adapted to render the map and generate the navigation instructions based on the position coordinates.

58. The apparatus according to claim 57, wherein the client device is coupled to receive an initial location reading from the location providing device, and is adapted to match the initial location reading to the directional links in order to find the position coordinates with respect to the route.

59. The apparatus according to claim 53, wherein the data structure representing each directional link comprises a field indicating at least one of a distance to the destination and a time to the destination from a location associated with the directional link.

60. The apparatus according to claim 53, wherein the data structure representing at least one of the directional links comprises a prompt, so as to cause the client device to request updated information from the server as a user of the client device travels over the route at a location associated with the directional link.

61. The apparatus according to claim 53, wherein the server is adapted to define a corridor map comprising the route and other roads included in the map data in a vicinity of the route, and to sort the other roads in the corridor map according to a respective distance of each of the roads from a location of the client device, and to download the map data with respect to the other roads in an order responsive to the distance.

62. The apparatus according to claim 61, wherein the server is adapted to stream the map data to the client device in the order responsive to the distance as a user of the client device travels along the route.

63. The apparatus according to claim 62, wherein the server is adapted to perform a breadth-first search of the other roads connecting to the starting point of the route, and to download the map data with respect to the roads found by the breadth-first search immediately after defining the corridor map.

64. Apparatus for displaying a map on a mobile client device, the apparatus comprising:
a memory, which is arranged to store map data;
a client device; and
a server, which is adapted to determine a route from a starting point to a destination within an area covered by the map data, the route comprising a sequence of route segments, and to associate a prompt with at least one of the route segments, so as to cause the client device to request updated information with respect to the route as a user of the client device travels over the route at a location associated with the at least one of the route segments, and which is coupled to download the route segments to the client device,
wherein the client device is adapted to render an image of a map indicative of the route, using the downloaded route segments, and is further adapted, responsively to the prompt, to submit a request to the server for the updated information, and wherein the server is adapted to provide the updated information with respect to the route in response to the request.

65. The apparatus according to claim 64, wherein the server and the client device are coupled to communicate over a wireless link.

66. The apparatus according to claim 64, wherein the request comprises a Hypertext Transfer Protocol (HTTP) request, and wherein the server is adapted to provide the updated information in a HTTP response.

67. The apparatus according to claim 64, wherein the updated information comprises a notice to the client device of a change in the route.

68. A computer software product for displaying a map on a mobile client device, the product comprising a computer-readable medium in which program instructions are stored, which instructions, when read by a computer, cause the computer to read map data, comprising road data with respect to roads of multiple different road types, and to determine a route from a starting point to a destination within an area covered by the map data, the route comprising one or more route segments, the instructions further causing the computer to define a corridor map comprising the route segments and the roads of the different road types that are within different, respective distances, determined by the road types, of the route segments, and to download the road data with respect to the route segments and the roads of the different road types comprised in the corridor map to the client device so as to enable the client device, using the downloaded road data, to render one or more images, each image comprising at least a respective portion of the corridor map.

69. The product according to claim 68, wherein the instructions cause the computer to determine the route along which a user of the client device is to travel, and to download the map segments one after another in sequence as the user travels along the route.

70. The product according to claim 68, wherein the instructions cause the computer to download the map data to the client device over a wireless link.

71. The product according to claim 68, wherein a classification of the roads into the different road types corresponds to expected speeds of travel on the roads.

72. The product according to claim 71, wherein the road types comprise at least first and second road types, the first road type having a higher expected speed of travel than the second road type, and wherein the instructions cause the computer to incorporate in the map segments the roads of the first and second road types that are within respective first and second distances of the route segments, such that the first distance is greater than the second distance.

73. The product according to claim 68, wherein the road types comprise highways and local streets, and wherein the instructions cause the computer to incorporate in the map segments the highways that are within a first distance of the route segments and the local streets that are within a second distance of the route, such that the first distance is greater than the second distance.

74. The product according to claim 68, wherein the instructions cause the computer to identify junctions along the route, and to associate respective measures of complexity with the junctions, and to modify the respective distances responsively to the measures of complexity.

75. The product according to claim 74, wherein the instructions cause the computer to increase the respective distances in a vicinity of the junctions that are characterized as complex junctions.

76. The product according to claim 74, wherein the respective measures of complexity comprise a junction complexity score that is determined for each junction responsively to a topology of the junction.

77. The product according to claim 74, wherein the instructions cause the computer to define maneuvers to be performed at the junctions along the route, and wherein the respective measures of complexity comprise a maneuver complexity score for each maneuver.

78. The product according to claim 68, wherein the instructions cause the computer to identify junctions at which the roads comprised in the one or more map segments intersect with further roads of the different road types that are not within the respective distances, and to add one or more of the further roads to the one or more map segments.

79. The product according to claim 68, wherein the instructions cause the computer to determine the route along which a user of the client device is to travel, and to determine a respective path to the destination from each of at least some of the roads comprised in each of the map segments, and to download the respective path to the client device in order to guide the user to the destination in the event of a deviation from the route onto one of the at least some of the roads.

80. The product according to claim 79, wherein the instructions cause the computer to associate with each of the roads in the corridor map a pointer to a subsequent road along the respective path, and to download the pointer to the client device.

81. The product according to claim 68, wherein the corridor map has a width that is defined at each point along the route by an extent of the roads of the different road types that are comprised in the corridor map in a vicinity of the point, and wherein the width of the corridor map varies along the route responsively to the extent of the roads.

82. The product according to claim 68, wherein the instructions cause the computer to sort the roads according to a respective distance of each of the roads from a location of the client device, and to download the road data with respect to the roads in an order responsive to the distance.

83. A computer software product for displaying a map on a mobile client device, the product comprising a computer-readable medium in which program instructions are stored, which instructions, when read by a computer, cause the computer to read map data, and to determine a route from a starting point to a destination within an area covered by the map data, the route comprising a sequence of the directional links, in which each directional link is represented by a data structure containing a pointer to a succeeding directional link along the route, and to download the route to the client device, so as to enable the client device, using the downloaded route, to render a map indicative of the route.

84. The product according to claim 83, wherein the instructions cause the client device to generate navigation instructions for a user of the client device based on the pointer in one or more of the data structures.

85. The product according to claim 84, wherein the map comprises a maneuver map, which is generated by the client device responsively to the navigation instructions.

86. The product according to claim 84, wherein the instructions cause the computer to define a corridor map, comprising the route and further directional links corresponding to other roads included in the map data in a vicinity of the route, such that the client device is able to guide the user to the destination, responsively to the pointer in one or more of the data structures corresponding to the other roads, in the event of a deviation from the route onto one of the other roads.

87. The product according to claim 83, wherein the data structure representing each directional link comprises a field indicating at least one of a distance to the destination and a time to the destination from a location associated with the directional link.

88. The product according to claim 83, wherein the data structure representing at least one of the directional links comprises a prompt, so as to cause the client device to request updated information from the server as a user of the client device travels over the route at a location associated with the directional link.

89. The product according to claim 83, wherein the instructions cause the computer to define a corridor map comprising the route and other roads included in the map data in a vicinity of the route, and to sort the other roads in the corridor map according to a respective distance of each of the roads from a location of the client device, and to download the map data with respect to the other roads in an order responsive to the distance.

90. The product according to claim 89, wherein the instructions cause the computer to stream the map data to the client device in the order responsive to the distance as a user of the client device travels along the route.

91. The product according to claim 90, wherein the instructions cause the computer to perform a breadth-first search of the other roads connecting to the starting point of the route, and to download the map data with respect to the roads found by the breadth-first search immediately after defining the corridor map.

92. A computer software product for displaying a map on a mobile client device, the product comprising a computer-readable medium in which program instructions are stored, which instructions, when read by a computer, cause the computer to read map data and to determine a route from a starting point to a destination within an area covered by the map data, the route comprising a sequence of route segments, and to associate a prompt with at least one of the route segments, so as to cause the client device to request updated information with respect to the route as a user of the client device travels over the route at a location associated with the at least one of the route segments, and to download the route segments to the client device so as to enable the client device to render an image of a map indicative of the route, using the downloaded route segments, the instructions further causing the computer to receive, responsively to the prompt, a request from the client device for the updated information, and to provide the updated information with respect to the route in response to the request.

93. The product according to claim 92, wherein the request comprises a Hypertext Transfer Protocol (HTTP) request, and wherein the instructions cause the computer to provide the updated information in a HTTP response.

94. The product according to claim 92, wherein the updated information comprises a notice to the client device of a change in the route.

* * * * *